T. W. ROBINSON.
WHEEL AND AXLE FOR ROLLER SKATES.
APPLICATION FILED JULY 18, 1910.
1,033,271. Patented July 23, 1912.
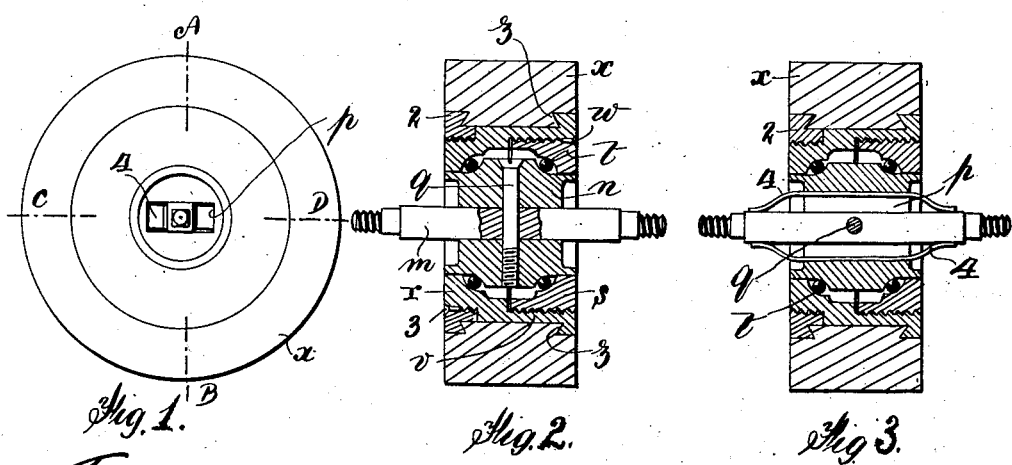

UNITED STATES PATENT OFFICE.

THOMAS WILLIAM ROBINSON, OF STREATHAM, LONDON, ENGLAND.

WHEEL AND AXLE FOR ROLLER-SKATES.

1,033,271.      Specification of Letters Patent.      Patented July 23, 1912.

Application filed July 18, 1910. Serial No. 572,571.

*To all whom it may concern:*

Be it known that I, THOMAS WILLIAM ROBINSON, a subject of the King of England, residing at Winton Lodge, Leigham Court Road, Streatham, London, England, have invented certain new and useful Improvements in Wheels and Axles for Roller-Skates; and I do hereby declare the following to be a full, clear, and exact description of the invention, such as will enable others skilled in the art to which it appertains to make and use the same.

This invention relates to improvements in rollers for roller skates and has for its object to so construct the rollers as to enable the skater to round curves with great facility.

For a full understanding of the invention, reference will be had to the accompanying drawing illustrating a preferred embodiment thereof, and in which drawing like characters of reference indicate corresponding parts.

Figure 1 is a view in elevation of a roller embodying my invention; Fig. 2 is a vertical section taken on the line A—B, and, Fig. 3 is a transverse section taken on the line C—D.

Referring to the drawing, $n$ is a hub provided with a rectangular aperture $p$. This hub is pivoted to a square spindle $m$ by means of a pin $q$. It will be seen from Figs. 1 and 3 that when the spindle $m$ is central in the slot $p$ of the hub $n$, there is a space between the spindle and the end surfaces of the slot, which allows for a certain angular movement of the hub around the pin $q$ with respect to the spindle $m$. The hub $n$ is provided with ball bearing surfaces. $r$ and $s$ are ball bearing cups which are mounted on the hub $n$ and between the hub and the cups $r$ and $s$ are interposed balls $t$. The cup $r$ has a tubular extension $v$ into which the cup $s$ screws so as to allow for the wear being taken up. These cups $r$ and $s$ are locked with respect to one another by a small screw $w$.

$x$ is a tire of rubber or other suitable material forming the running surface of the roller. The tire fits over the tubular extension $v$ and the outer surface of the cup $r$, and is held and locked in position against the dove-tailed edge $c$ by a screw ring 2 which screws upon the outer end of the extension $v$. The ring is locked in that position by means of a screw pin 3.

4 represents flat springs mounted so as to press upon the two opposite sides of the square spindle $m$, and also bear against the end surfaces of the rectangular slot $p$, so that the tendency is to keep the square spindle $m$ normally vertical to the plane of the roller. The spindle $m$ may be fixed in the frame of the skate so that the slot $p$ of the hub $n$ will be in a horizontal position as shown in Figs. 1 and 2 or a vertical position as shown in Fig. 3, or in any suitable angular position, preferably sixty-five degrees to the horizontal, which angle has been found to answer well in practice.

It is to be understood that slight changes in the details of construction and combination and arrangement of the parts may be resorted to without sacrificing any of the advantages or departing from the principle of the invention.

Having fully described my invention, what I claim is:—

1. In a skate wheel, the combination of a roller rotatably mounted on a hub, the hub having an elongated slot, a spindle pivoted in the slot, and means for normally holding the spindle centrally of said slot.

2. In a skate wheel, the combination of a roller rotatably mounted on a hub, the hub having an elongated slot, a spindle pivoted in the slot, and springs interposed between the spindle and the end surfaces of the slot for normally holding the spindle centrally of said slot.

In testimony whereof, I affix my signature, in presence of two witnesses.

THOMAS WILLIAM ROBINSON.

Witnesses:
    L. SIMMONDS,
    A. E. VIDAL.